United States Patent [19]

Morishita

[11] Patent Number: 5,266,882

[45] Date of Patent: Nov. 30, 1993

[54] CONTROL DEVICE FOR AN ALTERNATING CURRENT GENERATOR OF A VEHICLE

[75] Inventor: Mitsuharu Morishita, Himeji, Japan

[73] Assignee: Mitsubishi Denki Kabushiki Kaisha, Tokyo, Japan

[21] Appl. No.: 903,734

[22] Filed: Jun. 24, 1992

[30] Foreign Application Priority Data

Jul. 18, 1991 [JP] Japan ................................ 3-177900

[51] Int. Cl.$^5$ .................................................. H02J 1/14
[52] U.S. Cl. .................................... 322/28; 322/33; 320/64
[58] Field of Search ................. 322/27, 28, 33, 59, 322/99, 34; 320/64, 68

[56] References Cited

U.S. PATENT DOCUMENTS

| | | | |
|---|---|---|---|
| 4,220,908 | 9/1980 | Nicol | 322/33 |
| 4,388,586 | 6/1983 | Lamoth | 320/64 X |
| 4,388,587 | 6/1983 | Lamoth et al. | 320/64 X |
| 4,398,140 | 8/1983 | Morishita | 322/34 X |
| 4,435,676 | 3/1984 | Morishita | 320/64 X |
| 4,496,898 | 1/1985 | Iwaki et al. | 322/34 |
| 4,584,516 | 4/1986 | Iwaki | 322/99 |
| 4,594,631 | 6/1986 | Iwaki | 322/33 X |
| 4,629,967 | 12/1986 | Voss | 322/28 |
| 4,694,239 | 9/1987 | Marchio et al. | 322/34 X |
| 4,739,243 | 4/1988 | Iwatani et al. | 322/28 X |
| 4,945,299 | 7/1990 | Watanabe | 322/33 |
| 4,992,722 | 2/1991 | Maruyama et al. | 322/33 |

FOREIGN PATENT DOCUMENTS

| | | |
|---|---|---|
| 0081891 | 1/1983 | European Pat. Off. |
| 3309447 | 12/1983 | Fed. Rep. of Germany |
| 2420874 | 9/1979 | France |
| 2172416 | 7/1986 | United Kingdom |

Primary Examiner—Kristine L. Peckman
Attorney, Agent, or Firm—Sughrue, Mion, Zinn, Macpeak & Seas

[57] ABSTRACT

A control device for an alternating current generator of a vehicle, having a storage battery which is charged by a rectified output of the generator, a field current detecting resistance (304) having a positive temperature coefficient, a voltage divider (305, 306) for setting a reference voltage, and a comparator (307) for comparing the potential drop across the current detecting resistance with the reference voltage to thereby control the field current duty cycle. The voltage divider includes a compensating resistor (319) to change the reference voltage in accordance with temperature.

1 Claim, 2 Drawing Sheets 5,266,882

CONTROL DEVICE FOR AN ALTERNATING CURRENT GENERATOR OF A VEHICLE

BACKGROUND OF THE INVENTION

This invention relates to a control device for an alternating current generator of a vehicle, particularly for controlling the field current of an alternating current generator.

FIG. 2 is a circuit diagram showing the construction of a conventional control device for an alternating current generator of a vehicle. In FIG. 2, reference numeral 1 designates an alternating current generator having an armature coil 101 in a star connection and a field coil 102, and 2, a three-phase full-wave bridge rectifier having three sets of diodes connected to the armature coil 101, a main rectified output terminal 201, an auxiliary rectified output terminal 202 and a grounded output terminal 203.

Reference numeral 3 designates a voltage regulator which controls an output voltage of the alternating current generator to a predetermined value by controlling the field current flowing in the field coil 102, 4, a battery charged by a rectified output of the alternating current generator, 5, a key switch, and 6, a charge display lamp.

Numerals 301 and 302 designate transistors connected in a Darlington pair which interrupt the field current of the generator, 303, a field discharge diode, and 304, a current detecting resistance inserted between the emitter of the transistor 301 and ground, and having a positive temperature coefficient. Numerals 305 and 306 designate voltage dividing resistances for setting a reference voltage, and having a positive temperature coefficient, 307, a comparator for comparing the divided voltage with the potential across resistance 304, and 308, a resistance for initial excitation of which one end is connected to the base of the transistor 302, and the output terminals of the comparator 307 and a comparator 309.

Numerals 310 and 311 designate resistances which divide a reference voltage, and 312 and 313, resistances which divide the voltage of the battery 4. The comparator 309 makes a comparison between these divided voltages. Numeral 314 designates a resistance, 315 and 316, diodes, 317, a Zener diode, and 318, a transistor, which form a reference voltage based on the voltage of the battery 4.

One end of the field coil 102 of the alternating current generator 1 is connected to the collectors of the transistors 301 and 302, and the anode of the field discharge diode 303. The other end thereof is connected to the auxiliary rectified output terminal 202, the cathode of the field discharge diode 303, and the other end of the resistance 308, as well as to the positive pole of the battery 4 whose negative pole is grounded, through the charge display lamp 6 and the key switch 5. The main rectified current output terminal 201 of the rectifier 2 is connected to the positive pole of the battery 4.

Next, an operational explanation will be given, referring to FIG. 2. When the key switch 5 is switched to ON, base currents flow to the transistors 302 and 301 from the battery 4 through the key switch 5, the charge display lamp 6, and the resistance 308, successively. An initial excitation current flows in the field coil 102 when the transistors 302 and 301 are switched ON. When the alternating current generator 1 is driven by an engine, not shown, in this state, power generation starts.

When power is generated, the emitter current of the transistor 301 which is correlated with the field current flowing in the field coil 102, that is, approximately equal to the field current, flows in the current detecting resistance 304. Therefore, a potential difference is generated across the resistance 304. This potential difference is compared with a junction point potential of the voltage dividing resistances 306 and 305 by the comparator 307. When the potential difference becomes higher than the junction point potential due to an increase of the field current, the output of the comparator 307 becomes "L" level, which switches the transistors 302 and 301 to OFF, and cuts off the field current. When the transistors 301 and 302 are switched to OFF, the output of the comparator 307 is reversed to the "H" level again, which switches the transistors 302 and 301 to ON again, and resumes the field current in the field coil 102.

By repeating the above operation, the field current is controlled so that it is restricted to a predetermined value, and the output voltage of the alternating current generator is controlled to a predetermined value. The alternating current signal generated by the alternating current generator 1, is rectified to a direct current by the rectifier 2, charges the battery 4 and activates the field coil 102.

When the charged voltage of the battery 4 reaches a predetermined value or more, the comparator 309 outputs an "L" level, which switches the transistors 302 and 301 to OFF. Furthermore, the circuit composed of the zener diode 317, the transistor 318 and the like, operates to maintain constant the reference voltage based on the voltage of the battery 4.

In the conventional control device constructed as above, the current detecting resistance 304 is provided with a low value of 10 to 100 m$\Omega$ to reduce the loss thereby. In a hybrid IC, generally, a conductor resistance of Ag/Pd is utilized as an electrode material. On the other hand, the voltage dividing resistances 305 and 306 forming a reference voltage for comparison, have a positive temperature coefficient of about 200 PPM. Since the voltage dividing resistances 305 and 306 are provided on opposite sides of the voltage junction point, which compensates for any influence by temperature, the voltage detecting level does not vary with temperature. However, the conductive material utilized as the temperature detecting resistance 304, has a positive temperature coefficient of about 500 PPM. Therefore, with an increase in temperature, the operating current value for the "L" level of the comparator 307 is decreased, and a negative temperature gradient is provided in a field current restricting value.

SUMMARY OF THE INVENTION

It is an object of the present invention to solve the above problems by providing a control device for an alternating current generator of a vehicle capable of restricting the field current without being influenced by temperature.

According to an aspect of the invention, there is provided a control device for an alternating current generator of a vehicle, having a storage battery which is charged by a rectified output of the generator, a current detecting resistance wherein current substantially equal to a field current flowing in a field coil of the generator, flows and which has a temperature coefficient, voltage setting means for setting a reference voltage for comparison, and a comparator for comparing the potential across the current detecting resistance with the reference voltage to restrict the field current of the generator by interrupting it, wherein the voltage setting means changes the reference voltage in accordance with temperature to compensate for the temperature gradient of the current detecting resistance.

In the control device of this invention, the potential difference across the current detecting resistance is increased with an increase of temperature, and the reference voltage also increases such that the field current control is not influenced by temperature.

DETAILED DESCRIPTION OF THE PREFERRED EMBODIMENT

Figure 1:
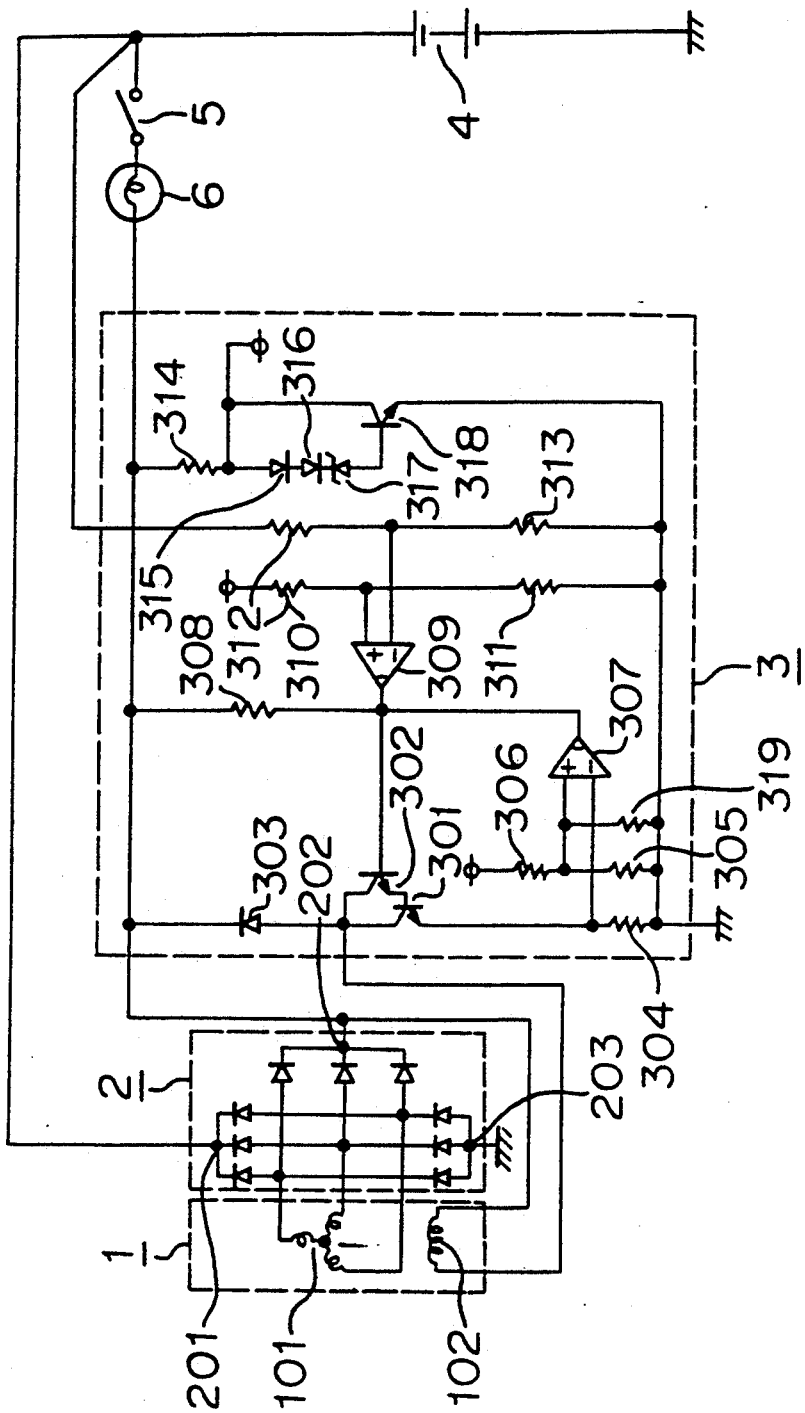
FIG. 1 is a circuit diagram showing an embodiment of a control device for an alternating generator of a vehicle according to the present invention.
Figure 2:
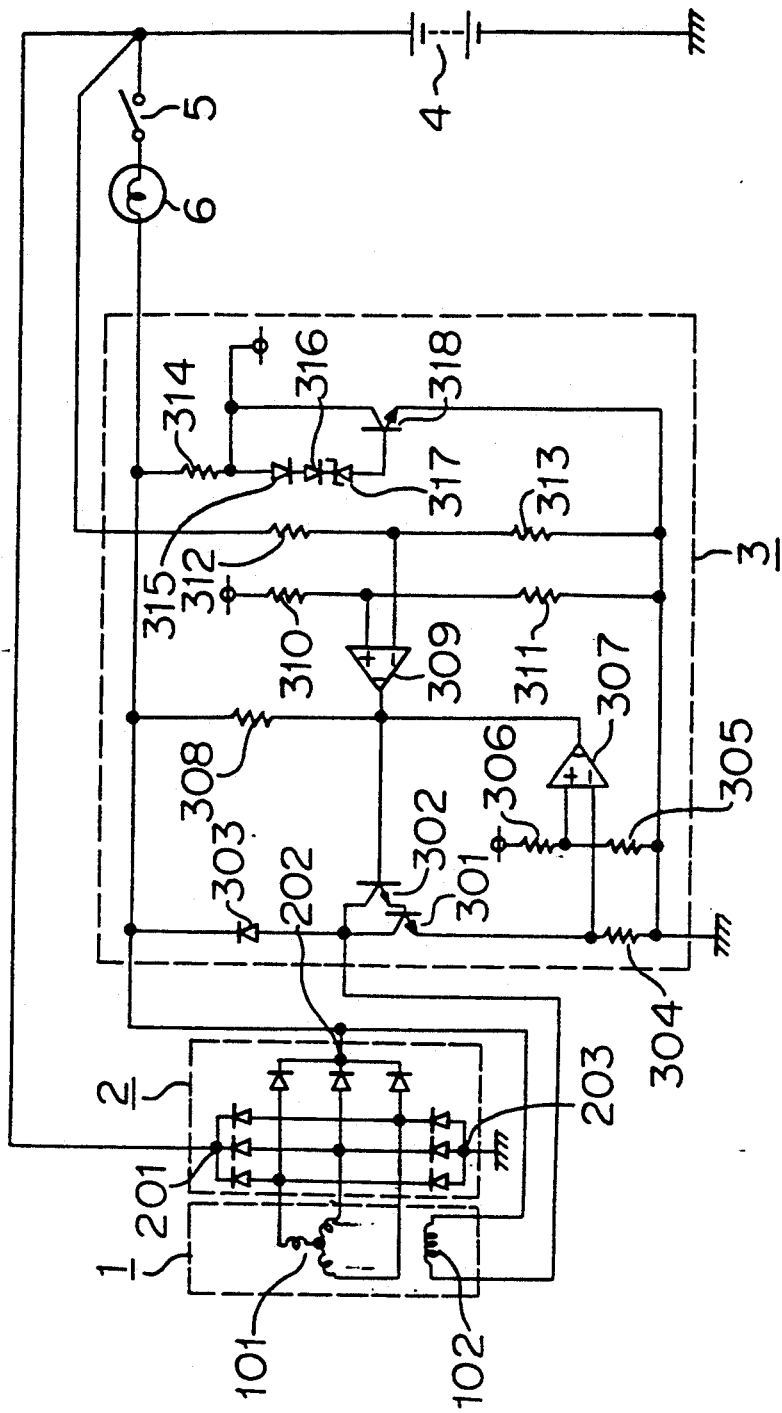
FIG. 2 is a circuit diagram showing a conventional device.

In FIG. 1, portions the same as or corresponding with those in the conventional example, are identified by the same reference numerals as in FIG. 2; and their explanation is omitted. In the voltage dividing resistances 305 and 306 for setting the reference voltage for comparison, a semiconductor resistance 319 having a positive temperature coefficient of about 2000 PPM, is connected in parallel to the voltage dividing resistance 305 on the lower or ground potential side (A thick film resistance is used in this example.). The remaining construction is the same as that in FIG. 2, and its explanation is omitted.

Next, an explanation will be given of the operation of the embodiment referring to FIG. 1. The comparator 307 compares the potential difference across the current detecting shunt resistance 304, with the reference voltage formed by the voltage setting means composed of the parallel connected resistance 305 and the semiconductor resistance 319 and the series resistance 306, and outputs the comparison result to the base of the transistor 302.

With this arrangement, when a current flows in the current detecting shunt resistance 304, the voltage drop across it increases with an increase of temperature due to its positive temperature coefficient of about 500 PPM. Accordingly, the resistance value of the series/parallel circuit of the voltage dividing resistances 306 and 305 having a positive temperature coefficient of about 200 PPM and the semiconductor resistance 319 having the temperature coefficient of about 2000 PPM is designed to compensate for the increase of the potential drop across resistance 304 by a corresponding increase of the reference voltage for comparison. In this way, it becomes possible to compensate for the negative temperature gradient of the field current restricting value due to the temperature coefficient of about 500 PPM of the current detecting shunt resistance 304.

I claim:

1. A control device for an alternating current generator of a vehicle, having a storage battery which is charged by a rectified output of the generator, comprising: a current detecting resistance (304) having a positive temperature coefficient and connected in series with a field coil of the generator for detecting a current flow therethrough, one end of the resistance being grounded, a voltage divider having first and second resistors (305, 306) connected in series between a power supply voltage and ground for providing a reference voltage at a junction thereof, a comparator (307) for comparing a voltage drop across the current detecting resistance with the reference voltage, and means responsive to the comparator output for interrupting the field current to control a duty ratio thereof, wherein the first and second resistors have equal positive temperature coefficients, and further comprising a third resistor (319) connected between the junction and ground, and having a positive temperature coefficient sufficiently greater than that of the first and second resistors such that a voltage at the junction changes with temperature in proportion to a temperature induced change in the voltage drop across the current detecting resistance.

* * * * *